United States Patent [19]
Zur Megede et al.

[11] Patent Number: 5,989,739
[45] Date of Patent: Nov. 23, 1999

[54] METHOD FOR OPERATING A FUEL CELL SYSTEM

[75] Inventors: Detlef Zur Megede, Bubesheim; Martin Schüssler, Ulm, both of Germany

[73] Assignee: DaimlerChrysler AG, Germany

[21] Appl. No.: 08/801,809

[22] Filed: Feb. 14, 1997

[30] Foreign Application Priority Data

Feb. 14, 1996 [DE] Germany .......................... 196 05 404

[51] Int. Cl.⁶ .................................................. H01M 8/06
[52] U.S. Cl. ................................................ 429/13
[58] Field of Search .................................................. 429/13

[56] References Cited

U.S. PATENT DOCUMENTS

| | | |
|---|---|---|
| 4,473,622 | 9/1984 | Chludzinski et al. . |
| 4,650,737 | 3/1987 | Vanderborgh et al. . |
| 4,904,548 | 2/1990 | Tajima . |
| 5,248,566 | 9/1993 | Kumar et al. . |

FOREIGN PATENT DOCUMENTS

| | | |
|---|---|---|
| 0 061 727 A2 | 10/1982 | European Pat. Off. . |
| 01186570 | 7/1989 | European Pat. Off. . |
| 02160602 | 6/1990 | European Pat. Off. . |
| 0 668 622 A1 | 8/1995 | European Pat. Off. . |
| 07335238 | 12/1995 | European Pat. Off. . |
| 4032652 | 4/1992 | Germany . |
| 4032993 | 5/1992 | Germany . |
| 44 23 587 A1 | 1/1996 | Germany . |

*Primary Examiner*—John S. Maples
*Attorney, Agent, or Firm*—Evenson, McKeown, Edwards & Lenahan, P.L.L.C.

[57] ABSTRACT

The invention relates to a method for operating a fuel cell system consisting of a fuel cell, a reformer for generating a hydrogen-rich gas, and a combustion chamber in which the fuel cell exhaust gases are oxidized to generate the heat energy required in the reformer. According to the invention, in those operating states in which the heat energy supplied to the reformer from the combustion chamber is insufficient, additional amounts of fuel and oxygen are supplied to the reformer, so that additional heat energy is produced directly in the reformer by the oxidation of the fuel. At the same time, during the oxidation of the fuel in the reformer, steam is produced that can be used in steam reformation. Advantageously, adjustment of the additional amount of fuel and the oxygen supplied is performed as a function of the reformer temperature.

7 Claims, 1 Drawing Sheet

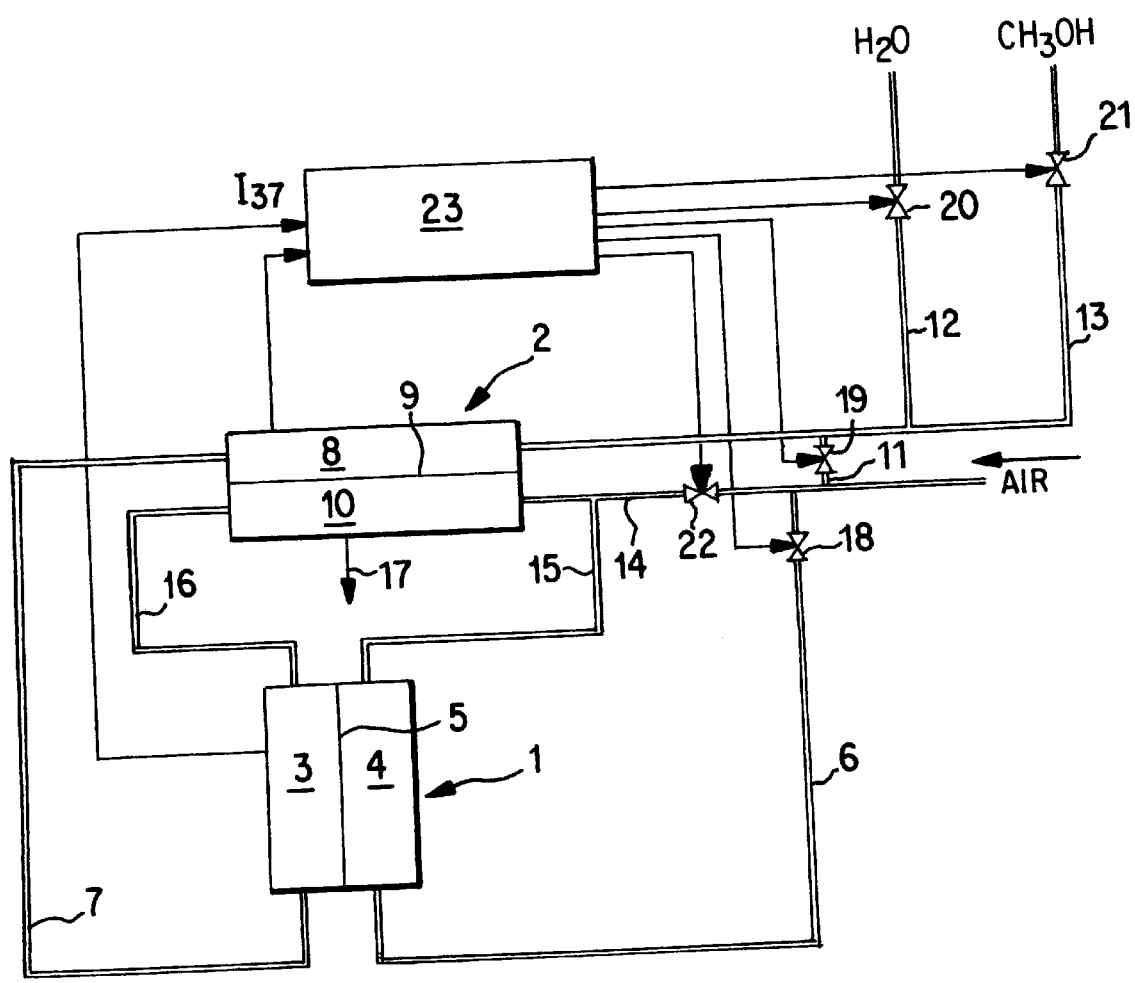

METHOD FOR OPERATING A FUEL CELL SYSTEM

BACKGROUND AND SUMMARY OF THE INVENTION

The invention relates to a method for operating a fuel cell system of the type having a fuel cell, a reformer for generating a hydrogen-rich gas, and a combustion chamber in which fuel cell exhaust gases are oxidized to generate heat energy required in the reformer.

A fuel cell system disclosed in U.S. Pat. No. 4,904,548, produces a hydrogen-rich gas in a reformer from liquid methanol and water, by means of steam reformation. Thereafter, the gas is supplied to the anode of the fuel cell system. The heat energy required for endothermal steam reformation is generated in a combustion chamber by oxidation of the anode exhaust and/or fuel and transferred to the reformer.

The goal of the present invention is to provide a method for operating a fuel cell system with improved overall efficiency.

This goal is achieved according to the invention by supplying an additional amount of fuel and oxygen to the reformer whenever the heat energy supplied to the reformer from the combustion chamber is insufficient, so that additional heat energy is generated directly in the reformer by the oxidation of the fuel. Oxidation of the fuel directly in the reformer in this manner has the advantage that the steam thus produced can be used for steam reformation of the fuel. As a result, less water is required. In addition, there is no need for the heat energy that would otherwise be required for evaporating the water. Finally, the dynamics of the gas generation system are improved by generating the heat energy directly in the reformer.

By controlling or regulating the additional amounts of fuel and oxygen added on the basis of reformer temperature, the overall efficiency of the fuel cell system can be further increased, since only that amount of fuel is oxidized at a given time which is required for maintaining steam reformation.

With a load change to higher power levels, the hydrogen requirement of the fuel cell increases abruptly. However, the production of hydrogen by the reformer lags behind this increased demand because of the limited dynamics involved. Therefore, for the duration of this lag, the hydrogen content in the anode exhaust is reduced, decreasing the available heat energy. However, because of the increased hydrogen demand, an increased heat requirement also develops at precisely the same time. Thus, it is advantageous during such a load increase to supply an additional amount of fuel and oxygen to the reformer for a predetermined period of time so that the reduced heat supply is compensated by the burner.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic diagram which shows the structure of a fuel cell system according to the invention.

The fuel cell system consists of a fuel cell 1 and a reformer 2. Fuel cell 1 has an anode chamber 3 and a cathode chamber 4, separated by a proton-conducting membrane 5. A gas containing oxygen, air for example, is supplied to cathode chamber 4 through a line 6. Anode chamber 3 is supplied with a gas containing hydrogen from reformer 2 through a line 7.

Fuel cell 1 can be designed as a single cell or as a so-called fuel cell stack. In the fuel cell, electrical energy is released from the chemical energy bound up in the reaction partners. For this purpose, the hydrogen is oxidized at anode 3 while the oxygen is reduced at cathode 4. During this electrochemical reaction, a voltage develops between the electrodes. By connecting many such cells in parallel or in series, voltages and currents can be achieved that are sufficient to drive a vehicle.

Reformer 2 consists of a reaction chamber 8 that is separated by a heat conducting partition 9 from a combustion chamber 10. Oxygen, water and fuel can be supplied to reaction chamber 8 through lines 11–13. According to this embodiment, the oxygen is supplied in the form of air and the fuel is supplied in the form of methanol, $CH_3OH$. However, pure oxygen or another suitable fuel can be used. The media—air, water, and fuel—are supplied to combustion chamber 10 at ambient temperature, so that the water and fuel are in the liquid state. There is no previous evaporation of the water or fuel.

Combustion chamber 10 is supplied through lines 14–16 with air or with fuel cell exhaust gases from cathode chamber 4 and/or anode chamber 3. If necessary, the cathode exhaust gas can also be conducted into reaction chamber 8 or directly into the open. The combustion exhaust gases are carried away through another line 17 from combustion chamber 10. Metering valves 18–22 in lines 6, 11–14 are controlled by a control device 23. The current $I_{BZ}$ generated by fuel cell 1 and the temperature $T_{ref}$ of reformer 2 are supplied, together with other values, as input parameters to control device 23.

In reaction chamber 8 of reformer 2, a hydrogen-rich gas is generated from the fuel with the addition of water, with steam reformation on a suitable catalyst:

$$CH_3OH+H_2O=3H_2+CO_2 \tag{1}$$

The volume of fuel and water added depends on the quantity of hydrogen consumed in fuel cell 1. Since the hydrogen consumption is proportional to the current $I_{BZ}$ generated in the fuel cell, the required amounts of fuel and water are determined in control device 3 from the fuel cell current $I_{BZ}$ and adjusted accordingly by metering valves 21, 20. At the same time, the quantity of air required in cathode chamber 4 is determined in control device 23 and adjusted by metering valve 18. It is important to note in this connection that fuel cells are usually operated with a surplus of reaction partners. For example, hydrogen is supplied to anode chamber 3 in an amount that is 120–150% of the actual reaction volume. Therefore, a large hydrogen component is also contained in the anode exhaust gas. The cathode exhaust gas contains surplus oxygen as well as water that is generated in the fuel cell reaction.

The anode gas is supplied to combustion chamber 10 of reformer 2 through line 16, where it reacts to release heat energy:

$$2H_2+O_2=2H_2O \tag{2}$$

The heat energy is conducted through heat-conducting partition 9 into reaction chamber 8 in order to satisfy the heat requirement there, on the basis of endothermal steam reformation. In addition to this direct provision of heat energy from combustion chamber 10 in reaction chamber 8, it is also possible to connect a heat-carrying medium in between.

In a first operating state $Z_1$, in which the heat energy generated by the combustion of the fuel cell exhaust gases is sufficient to maintain steam reformation in reaction chamber 8 of reformer 2, the admission of air to reaction chamber 8 is suppressed by closing metering valve 11, and the required amounts of fuel and water are determined exclusively on the basis of the instantaneous fuel cell current $I_{BZ}$.

Additional air can be added to combustion chamber 10 at any time through metering valve 22. This operating state $Z_1$, in other words with the stated hydrogen surplus, has the best overall efficiency of the fuel cell system described, since no additional fuel is required to generate heat.

In practice, however, additional combustion of fuel is often necessary when the heat energy conveyed from combustion chamber 10 into reaction chamber 8 is insufficient to maintain endothermal steam reformation. This can be the case for example when the heat losses that occur are too great or when the hydrogen surplus in fuel cell 1 is too low. In addition, when a load change to higher power levels occurs, because of the time lag between the heat requirement of the steam reformation reaction and the surplus amount of hydrogen that is available in combustion chamber 10, the supply of heat energy may be insufficient.

In the method according to the invention, therefore, a second operating state $Z_2$ is provided in which an additional amount of fuel $K_+$ and a corresponding amount of air $L_+$ are conducted into reaction chamber 8 so that complete combustion of the additional amount of fuel  takes place therein, ideally with the release of heat:

$$CH_3OH + 1.5O_2 = CO_2 + H_2O \qquad (3)$$

In this second operating state $Z_2$, therefore, both reactions (1) and (3) proceed in parallel. As a result, it is possible to use the steam that is produced by complete combustion for steam reformation. Hence, the amount of water added from the outside can be reduced by a corresponding adjustment of metering valve 20 for this amount, which leads to a reduced water requirement for the system. On the other hand, however, less energy is required since the water from reaction (2) is already present in the form of steam, so that the overall efficiency of the system is increased as well.

The amount of air $L_+$ added to reaction chamber 8 in the second operating state $Z_2$ is chosen so that it is just sufficient for oxidation of the additional amount of fuel $K_+$ added. The total amount of fuel supplied to reaction chamber 8 in the second operating state $Z_2$ therefore consists of the amount that is required to generate hydrogen according to equation (1) and the amount of fuel $K_+$ that is required for oxidation according to equation (3). In the first operating state $Z_1$ on the other hand, no air and only the amount of fuel required according to equation (1) are supplied to reaction chamber 8. The additional amount of fuel $K_+$ and the amount of air $L_+$ depend upon the heat requirement in reaction chamber 8. They can therefore be determined in control device 23 as a function of the reformer temperature $T_{ref}$ and adjusted accordingly with the aid of metering valves 21, 19. However it is also possible to supply fixed amounts of additional fuel $K_+$ and air $L_+$ with the temperature regulation then being performed exclusively by switching between the two operating states $Z_1$ and $Z_2$.

In addition to temperature $T_{ref}$, however, the quantity of hydrogen in the anode exhaust gas and/or the current load can be used as guideline values for determining the additional amounts of fuel $K_+$ and air $L_+$. The amount of hydrogen in the anode exhaust gas can be determined by a suitable sensor in line 16. The required load is detected for example from the position of the accelerator. Instead of the current load, however, the load curve over a time interval $\Delta t$ from a previous point in time $t-\Delta t$ to the current point in time t can also be used.

By deliberately switching between these two operating states $Z_1$ and $Z_2$, the consumption of unnecessarily large amounts of fuel can be prevented. In addition, this fuel cell system exhibits improved dynamics since the additional heat energy required is generated directly in reaction chamber 8 of reformer 2 and is therefore immediately available for steam reformation.

Switching between the two operating states $Z_1$ and $Z_2$ is accomplished for example with the aid of a temperature-monitoring device in reaction chamber 8 of reformer 2. If the temperature $T_{ref}$ in reaction chamber 8 falls, the second operating state $Z_2$ is activated. If the temperature is sufficient, a switch is made to the first operating state $Z_1$. Corresponding threshold values $T_{s1} <= T_{s2}$ can be provided for the switching processes, and the two threshold values for activation $T_{s1}$ or deactivation $T_{s2}$ of the second operating state $Z_2$ can differ.

As already described above, with a load change to higher power levels, it is important to note that the temperature $T_{ref}$ drops because of the reduced hydrogen surplus in the anode exhaust gas. In order to prevent a temperature drop in reaction chamber 8, therefore, when such a load change to higher power levels is detected, a switch can be made in control device 23 for a predetermined period of time $t_2$ to the second operating state $Z_2$. Of course the switching criteria described above can also be combined as desired.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for operating a fuel cell system of the type having a fuel cell with an anode chamber and a cathode chamber, a hydrogen-rich gas being supplied to the anode chamber and an oxygen-containing gas being supplied to the cathode chamber; a reformer for generating hydrogen-rich gas from a fuel with the aid of endothermal steam reformation, with fuel and water being fed to a reaction chamber of the reformer, at ambient temperature, and as a function of the required volume of hydrogen-rich gas; and a combustion chamber in which fuel cell exhaust is oxidized by the addition of oxygen, with resultant heat energy being fed to the reaction chamber of the reformer; said method comprising:

in a first operating state providing heat energy for steam reformation exclusively by oxidation of the fuel cell exhaust in the combustion chamber;

in a second operating state, in which reaction heat from the combustion chamber is insufficient, supplying an additional fuel amount and oxygen amount to the reaction chamber of the reformer; and switching between operating states as a function of reformer temperature, load curve, and/or hydrogen content in an exhaust of said anode, wherein said switching step comprises:
   detecting temperature in the reformer;
   comparing temperature in the reformer with a preset temperature threshold; and
   switching to the second operating state when the preset temperature threshold is undershot.

2. Method according to claim 1 wherein comprising the further step of switching back to the first operating state when a second temperature threshold value is exceeded.

3. Method according to claim 1 wherein the additional amount of fuel and additional amount of oxygen are determined as a function of the reformer temperature.

4. Method according to claim 1, wherein the additional amount of fuel and additional amount of oxygen are determined as a function of volume of hydrogen in the anode exhaust and/or load required at the moment.

5. Method according to claim 1 wherein the additional amount of fuel and additional amount of oxygen are determined as a function of the load curve in a time interval from a previous point in time up to the current point in time.

6. Method according to claim 1 wherein when the load increases, the second operating state is activated for a preset time interval.

7. Method according to claim 1 wherein the amount of water added is reduced in the second operating state.

* * * * *